Figure 1:
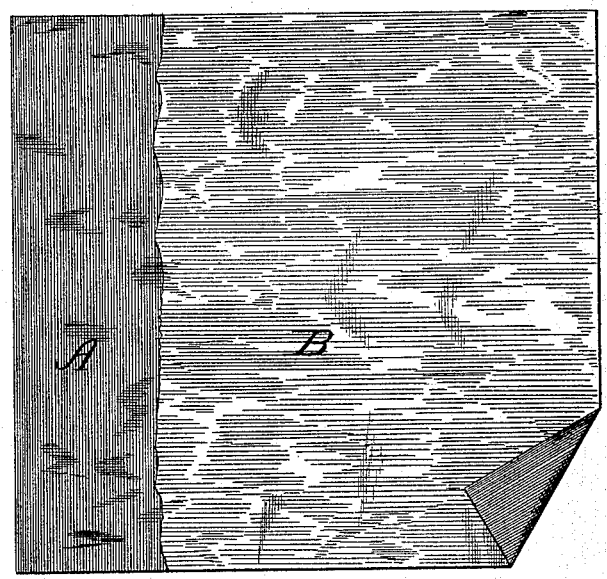

(No Model.)

E. T. STARR.
METHOD OF LINING DENTAL PLATES WITH GOLD.

No. 413,376. Patented Oct. 22, 1889.

WITNESSES:
Edw. F. Simpson Jr.
Arthur C. Clarke.

Eli T. Starr,
INVENTOR
by his Atty
Wm. F. Peyton

United States Patent Office.

ELI T. STARR, OF PHILADELPHIA, PENNSYLVANIA, ASSIGNOR TO THE S. S. WHITE DENTAL MANUFACTURING COMPANY, OF SAME PLACE.

METHOD OF LINING DENTAL PLATES WITH GOLD.

SPECIFICATION forming part of Letters Patent No. 413,376, dated October 22, 1889.

Application filed March 1, 1887. Serial No. 229,324. (No model.)

*To all whom it may concern:*

Be it known that I, ELI T. STARR, a citizen of the United States, residing at Philadelphia, in the county of Philadelphia and State of Pennsylvania, have invented certain new and useful Improvements in the Art of Lining Dental Plates with Gold; and I do hereby declare the following to be a full, clear, and exact description of the invention, such as will enable others skilled in the art to which it appertains to make and use the same.

My invention relates to the art of lining hard-rubber dental plates with gold. Rubber plates carrying the artificial teeth so much employed in fitting the human race with means of mastication when the natural denture has been lost or destroyed have been objectionable, for the reason that the action of the rubber upon the membrane and walls of the mouth covered by it in most cases is deleterious, the rubber being a non-conductor and confining the animal heat to the covered surface. To obviate this it was proposed, and in some cases successfully, to line the rubber plate with gold, which would conduct away the heat from the surface covered by the plate and keep said surface cool and in a natural condition. Various methods have been tried to this end; but in none of them, so far as I am aware, has the simplicity of means and manipulation been suggested to permit the lining of the plates with gold cheaply, readily, and with the result of close adhesion of the gold to the rubber, with a smooth surface thereof next the flesh of the wearer of the artificial denture.

The object of my invention is to provide an improved method and means for lining rubber plates with gold, so as to produce a cheap, simple, and substantially perfect lining, necessitating the exercise of but little skill in its application.

I apply the gold to the rubber in the form of a compound foil of gold and silver, a layer of silver forming one side of the foil and a layer of gold the other side. In applying the lining the silver side is placed next the rubber prior to the vulcanization thereof, and in the operation of vulcanizing the rubber is converted into sulphide of silver by the action of the sulphur of the rubber compound, with the result of an intimate and secure adhesion of the gold to the rubber by the interposed layer of silver sulphide.

Figure 2:
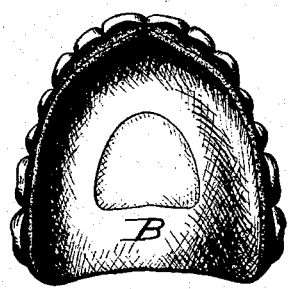
Figure 3:
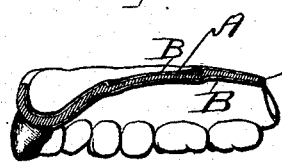

In the accompanying drawings I show in Figure 1 a sheet of the silver-gold foil, in Fig. 2 a hard-rubber dental plate lined therewith, and in Fig. 3 a section of such a plate, showing both sides thereof lined with the gold.

The compound silver-gold foil is made by uniting a sheet of silver-foil to a sheet of gold-foil by any of the usual processes of making a compound foil, as by sweating the two together.

A is the silver-foil, and B the gold-foil.

The method of lining a rubber plate with the silver-gold foil is or may be as follows: A cast of the mouth is taken, and upon it the artificial denture is shaped in the form of a temporary plate of wax, with the teeth in position, and having their bases or pin ends embedded in the wax plate, and after the case is thus formed the cast, with the wax plate and teeth, is set in a section of an ordinary metallic flask, and the usual plaster is poured in to fill or partially fill the flask-section around the cast without enveloping the wax plate until the flask-section is or may be flush or full. The top of the plaster filling is then smoothed off and varnished and oiled. The ring or second section of the flask is then applied, and the flask is then completely filled with an additional supply of the plastic plaster, which covers the entire surface of the wax plate and exposed surface of the teeth. The lid of the flask is now applied with slight pressure to squeeze out the excess of filling material. In a short time the plaster filling becomes set or hardened and the flask-sections are separated. They divide on the line of the oil surface of the first section, the top or ring section carrying with it the wax plate and teeth, the crown ends of which are embedded in the plaster filling of said section. This leaves the surface of the cast exposed in the first section, and it forms the male die of the flask. The wax plate is now softened by heat and removed, which leaves a seat forming the female die, the removal of the wax separating it from the fastening ends or bases of the teeth and leaving the crown ends embedded in the plaster of the ring-section of the flask. The mold is now ready to receive the vulcanizable rubber compound, which is to be packed in the female die around the protruding pin or fastening ends of the teeth, so as to occupy the space vacated by the wax plate. When so packed, the flask-sections are closed together, and the rubber vulcanized by subjecting the flask to the vulcanizing heat. These steps in making an artificial denture with a rubber plate are those generally employed by skillful dentists.

In order to line both the surfaces of such a dental plate, I proceed as follows: I coat the surface of the plaster cast or male die, after the wax plate is separated therefrom, in separating the flask-sections, with, for example, thickened shellac varnish, which forms a sticky surface on the cast. I then apply a sheet of the silver-gold foil of the proper size to said sticky surface of the cast, with the gold side next to said cast. The sticky surface is merely to hold the foil in position while it is being fitted to the cast, which may be done by burnishing or pressing the foil into the recesses in the surface of the cast. This should be carefully done to secure a uniform application of the foil to the cast. The silver side of the foil will now be next to or face the vulcanizable compound. So, also, after the wax plate is stripped from the female die a sheet of the silver-gold foil is applied in the same way—that is to say, with the silver side facing the rubber, which is then packed in to form the plate in the usual way. Both sides of the rubber are now lined with the silver-gold foil, with the gold side exposed, and upon subjecting the mold to the vulcanizing process there results a complete union of the lining with the vulcanized plate, so that said plate has a smooth uniform lining of gold. This is brought about by the attack of the sulphur in the rubber compound upon the silver of the compound foil, which is converted during the vulcanizing process into a sulphide, which forms an intimate mechanical union between the rubber and gold, the inner surface of the gold-foil being roughened by the chemical change which the silver undergoes, forming retaining-points for the secure hold of the rubber thereon. Either one or both sides of the plate may be lined.

I claim as my invention—

The improvement in the art of lining rubber dental plates, which consists in applying a compound foil to the rubber prior to vulcanization and in uniting it thereto by converting the silver into a sulphide during the vulcanizing process, substantially as described.

In testimony whereof I affix my signature in presence of two witnesses.

ELI T. STARR.

Witnesses:
JAMES F. LYND,
AGNES E. GOODWIN.